(12) United States Patent
Maruyama et al.

(10) Patent No.: US 6,353,847 B1
(45) Date of Patent: Mar. 5, 2002

(54) SYSTEM OPTIMIZATION APPARATUS EMPLOYING LOAD PREDICTION

(75) Inventors: Joji Maruyama; Takaaki Kawakami, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/173,774

(22) Filed: Oct. 16, 1998

(30) Foreign Application Priority Data

Mar. 6, 1998 (JP) ............................................ 10-055545

(51) Int. Cl.[7] .............................................. G06F 9/00
(52) U.S. Cl. ...................... 709/105; 709/100; 709/102; 709/221; 707/10
(58) Field of Search ............................... 709/100, 101, 709/102, 103, 104, 105, 221, 217, 241, 225; 707/10

(56) References Cited

U.S. PATENT DOCUMENTS

| | | | | |
|---|---|---|---|---|
| 5,778,224 A | * | 7/1998 | Tabe et al. ................... | 709/100 |
| 5,956,644 A | * | 9/1999 | Miller et al. ................. | 455/453 |
| 5,956,716 A | * | 9/1999 | Kenner et al. ................ | 707/10 |
| 5,978,844 A | * | 11/1999 | Kazuaki et al. .............. | 709/221 |
| 6,115,713 A | * | 9/2000 | Pascucci et al. .............. | 707/10 |
| 6,256,675 B1 | * | 7/2001 | Robinovich ................. | 709/241 |
| 6,269,394 B1 | * | 7/2001 | Kenner et al. ............... | 709/217 |

FOREIGN PATENT DOCUMENTS

| | | |
|---|---|---|
| JP | 2-60362 | 2/1990 |
| JP | 7-235985 | 9/1995 |
| JP | 8-23297 | 1/1996 |

* cited by examiner

*Primary Examiner*—Majid A. Banankhah
(74) *Attorney, Agent, or Firm*—Rosenman & Colin LLP (57) ABSTRACT

It is one objective of the present invention to provide a control apparatus, for system optimization using load prediction, which prevents congestion and utilizes resources more efficiently.

According to the present invention, a control apparatus which employs load prediction for system optimization comprises: a plurality of processors; a control target which is controlled by the plurality of processors; a load measurement means for comparing a current load with time-transient, reference load data, for the plurality of processors, which is obtained based on previously acquired measurement data, and for employing the result to prepare a future load prediction for each of the processors; and a control means for controlling distribution of a load for a specific processor to the other processors when a predicted load for the specific processor exceeds the reference load data.

30 Claims, 11 Drawing Sheets

Reticulately-illustrated section A : Permissible value
Normal line B : Reference load value
Bold line C : Current load data
Dotted line D : Predicted load

FIG. 7

| *1 | Load value (%) | x minuites later |
|---|---|---|
| *1 | Load value (%) | y minuites later |
| | . . . | . . . |
| *1 | Load value (%) | x minuites later |

*1 Predicted load state data (e.g., 0 = normal, 1 = abnormal)

FIG. 8A

| *1 | *2 | | *n |
|---|---|---|---|

*1 to *n : predicted load state data for CPRs 20 to 2n (e.g., 0 = normal, 1 = abnormal)

FIG. 8B

| *1 | *2 | | *n |
|---|---|---|---|

*1 to *n : predicted load state data for switchboards 100 to 1n0

(e.g., 0 = normal, 1 = abnormal)

FIG. 8C

| *1 | *2 | | *n |
|---|---|---|---|

*1 to *n : predicted load state data for networks 1 to n

(e.g., 0 = normal, 1 = abnormal)

FIG. 9

| *1 | Distribution destination data 1 |
|---|---|
| *1 | Distribution destination data 2 |
| *1 | Distribution destination data 3 |
| ⋮ |  |
| *1 | Distribution destination data n |

*1 : distribution enable/disable instruction data

SYSTEM OPTIMIZATION APPARATUS EMPLOYING LOAD PREDICTION

BACKGROUND OF THE INVENTION

1. Field of the Invention

The present invention relates to an apparatus for optimizing a system for which load prediction is employed, and in particular to a switchboard or a network having a load prediction function and a load control function.

2. Related Arts

Conventionally employed for a processor and a switchboard is a technique whereby, when a predetermined load or greater is imposed on a processor or a switchboard, operational control of the processor or the switchboard is assumed only when, for example, the number of calls produces a congested state and the device can not accept another call, and the load on the processor or the switchboard must be distributed to another like device to reduce the load locally.

The conventional technique, therefore, provides operational control only when a load reaches a specific level, i.e., a congested state. Thus, generally, the implementation of countermeasures is forestalled, and a processor does not recover from a congested state until the state of an external factor causing the congestion returns to normal. So long as the normal state of the external factor is not recovered, deterioration of service can not be avoided.

According to a technique which, from the beginning, to avoid a situation where a processing load is concentrated at a specific processor, provides for a load to be equally distributed among a number of processors, even when one of them can handle all the processing, unnecessary distribution of the processing load occurs. As a result, the processing is not performed efficiently.

SUMMARY OF THE INVENTION

It is, therefore, one objective of the present invention to provide a control apparatus, for system optimization using load prediction, which prevents congestion and utilizes resources more efficiently.

It is another objective of the present invention to provide a switchboard or a network, having a load measurement function and a load control function, which employs load prediction for system optimization.

To achieve the above objectives, according to the present invention, the basic structure of a control apparatus which employs load prediction for system optimization includes:

a plurality of processors; a control target which is controlled by said plurality of processors;

a load measurement means for comparing a current load with time-transient, reference load data, for said plurality of processors, which is obtained based on previously acquired measurement data, and for employing the result to prepare a future load prediction for each of said processors; and a control means for controlling distribution of a load for a specific processor to the other processors when a predicted load for said specific processor exceeds said reference load data.

A switchboard and a network, for which is applied the structure of the control apparatus for employing load prediction for system optimization, includes:

a plurality of switches for switching a call;

a plurality of processors for controlling the plurality of switches;

a load measurement means for comparing a current call process load with time-transient, reference call process load data, for the plurality of processors, which is obtained based on previously acquired measurement data, and for employing the result to prepare a future call process load prediction for each of the processors; and a control means for controlling distribution of a load for a specific processor to another processor having a low employment rate when a predicted call process load for the specific processor exceeds a predetermined permissible value which is based on the reference call process load data. With this arrangement, the switchboard and the network can control call process load optimization.

Specifically, the load measurement means is provided for each of the plurality of processors.

Additionally provided is a means for notifying a maintenance man of the reference call process load data.

Furthermore, a congestion level, for one of the processors, which is acquired from a future call process load prediction prepared by the load measurement means is reported to another processor.

Further, the control means, for controlling distribution of a load imposed on a specific processor to other processors when a predicted load to be imposed on the specific processor exceeds the reference load data, regulates the predicted load when the predicted load exceeds the reference load data.

Moreover, the control means, for controlling distribution of a load imposed on a specific processor to another processor having a low employment rate when a predicted call process load for the specific processor exceeds a predetermined permissible value based on the reference call process load data, controls call process load optimization so as to regulate calls which are input.

The previously acquired measurement data are updated based on the current call process load.

The permissible value which is to be distributed by the control means is updated based on the latest available resources.

Other objectives and features of the present invention will become apparent during the course of the description of the preferred embodiments which is given while referring to the accompanying drawings.

DETAILED DESCRIPTION OF THE PREFERRED EMBODIMENTS

The preferred embodiments of the present invention will now be described while referring to the accompanying drawings. It should be noted that the same reference numerals are used throughout to denote corresponding or identical components.

Figure 1:
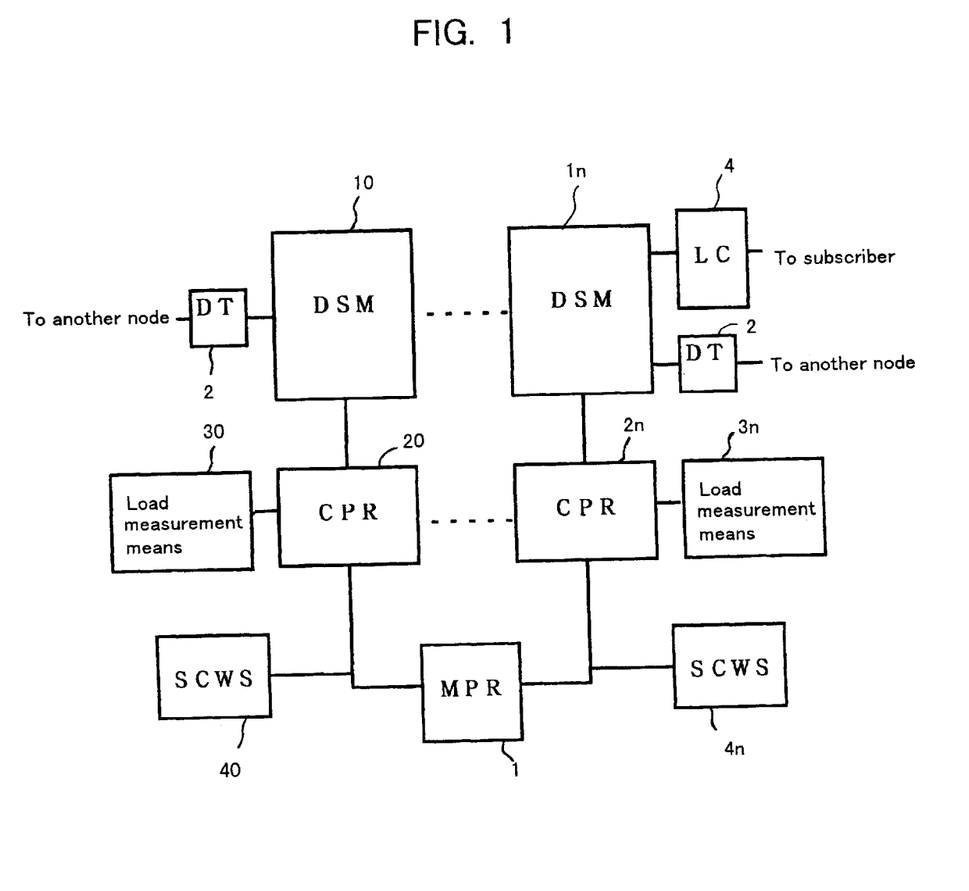
FIG. 1 is a block diagram illustrating the arrangement of a switchboard, according to one embodiment of the present invention, in which a load measurement means is provided for each call processor.

FIG. 1 is a block diagram illustrating an example arrangement of a switchboard, which is a control apparatus employing load prediction for system optimization, according to one embodiment of the present invention, and in which a load measurement means is provided for each processor.

In FIG. 1, a plurality of digital switch modules 10 to in are connected to another network across a digital terminal 2 and also to a subscriber across a concentrator 4, and are respectively connected to a plurality of call processors 20 to 2n, which are controlled by a common main processor 1.

The call processors 20 to 2n each comprise a central control block CC, for controlling the entire system and performing calculations; a main memory MM, in which a control program and data are stored; a file memory FM, for enabling random access to the control program and to data stored in the main memory MM; and a channel controller for transferring data between the main memory MM and the file memory FM, or between I/O devices (none of the components are shown).

The main processor 1 has the same structure as the call processors 20 to 2n. The main processor 1 and the call processors 20 to 2n are connected by a common bus.

Further, in FIG. 1 load measurement means 30 to 3n, according to the present invention, are connected to the call processors 20 to 2n. System control workstations 40 to 4n are also connected to the call processors 20 to 2n.

The system control workstations 40 to 4n have various function modes, including a system management mode. In the system management mode, the states of an output trunk line and the other trunk lines and of the apparatus are displayed and controlled. Also in the system management mode, the rate of employment is displayed for the central control block CC of each call processor 20 to 2n.

Therefore, as will be described later, the load measurement means 30 to 3n, which together constitute the feature of the present invention, can be so designed that they employ the employment rates for the central control blocks CC of the call processors 20 to 2n which are displayed in the system management mode, or that they have a function for displaying the employment rates for the central blocks CC.

Figure 4:
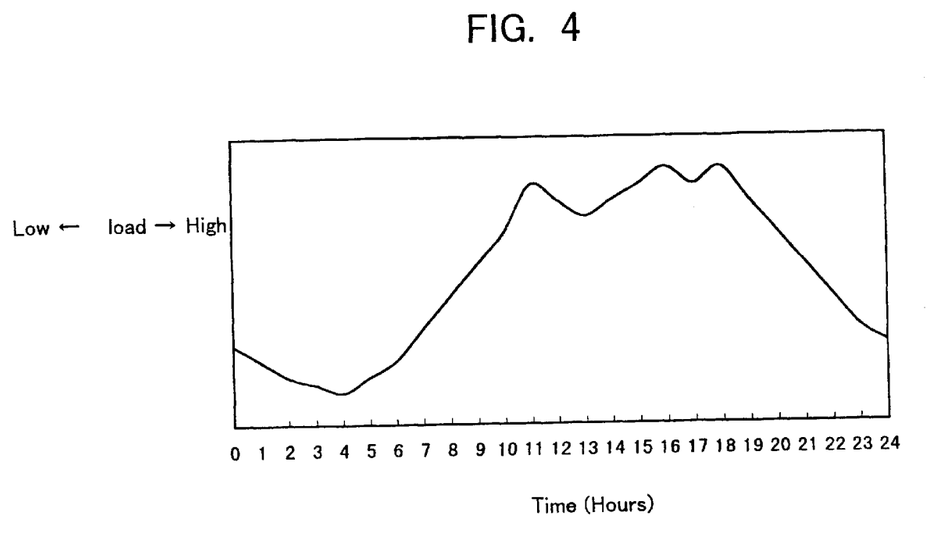
FIG. 4 is a graph showing example load transition data for a switchboard for one day.

The principle of the present invention will now be described while referring to FIGS. 4 and 5. In FIG. 4 are shown reference load transition data for the call processors 20 to 2n, in particular for the central control blocks CC, which are acquired from past data measured for one day.

A load permissible range is determined using the reference load transition data in FIG. 4, and system resources. In the load transition prediction graph in FIG. 5, the reference load transition data is indicated as a reference load value B, which is shown by a normal line, and the load permissible range is indicated as a permissible value A, which is shown by a reticulately illustrated section.

Figure 5:
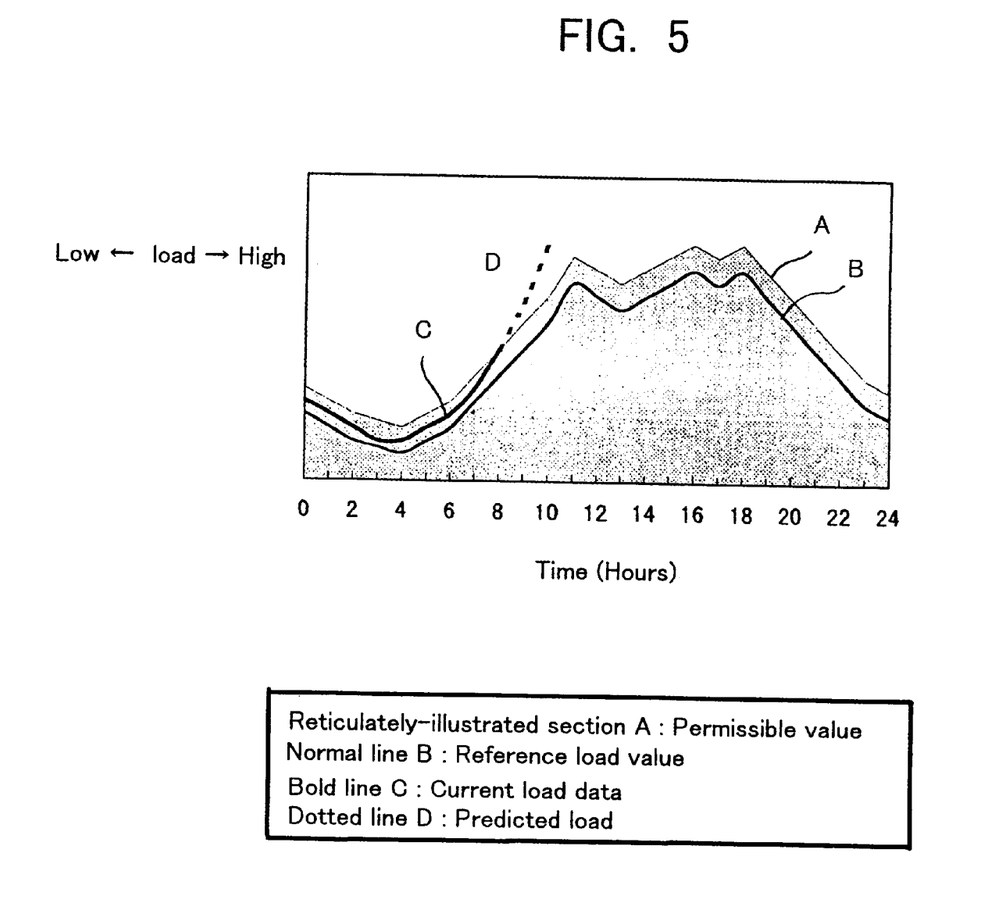
FIG. 5 is a graph showing example load transition predictive data for a switchboard for one day.

Further, current load data C is also shown by a bold line in FIG. 5. According to the present invention, the load measurement means 30 to 3n predict a future load D, which is shown by a dotted line in FIG. 5, from the trend observed for the current load data C. When the predicted load value D exceeds the permissible value A, load distribution is performed.

The load transition data for one day are employed in FIGS. 4 and 5, but transition data for weeks can also be employed.

Figure 2:
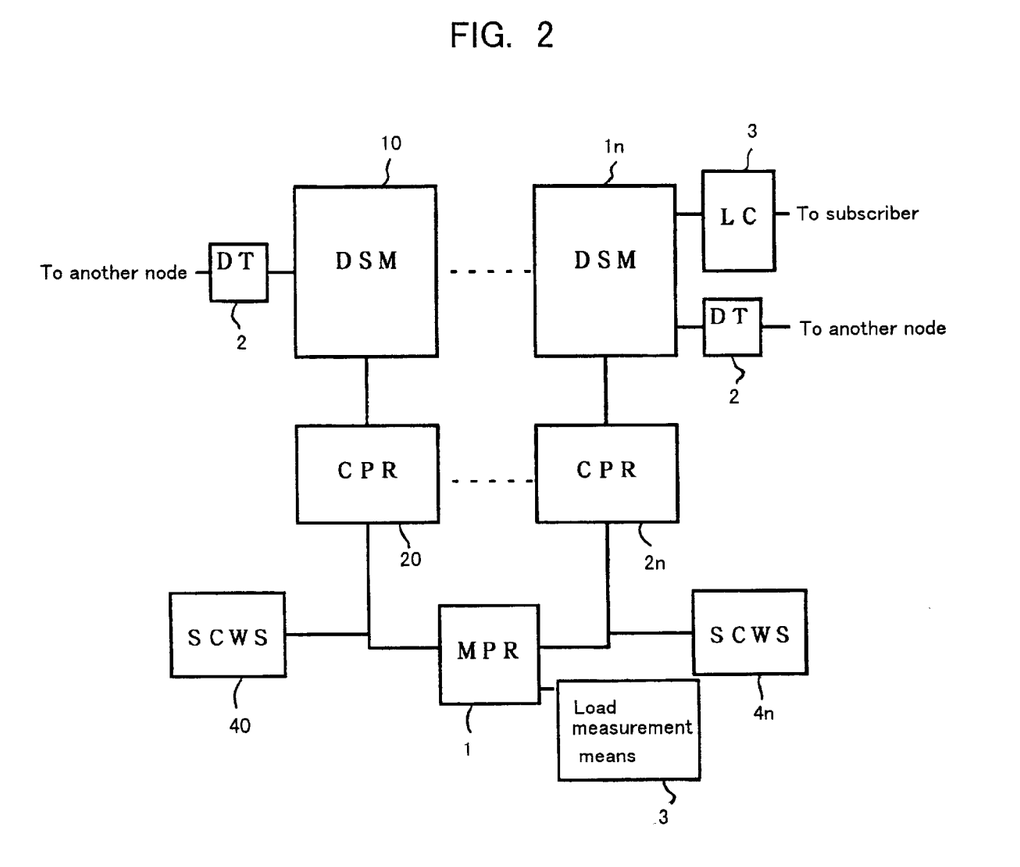
FIG. 2 is a block diagram illustrating the arrangement of a switchboard, according to another embodiment of the present invention, which includes a load measurement means.

In FIG. 2 is shown another embodiment of the present invention. The feature of the structure shown in FIG. 2 includes a load measurement means 3 used in common by all switchboards, in addition to the structures in FIG. 1. Thus, one function of the load measurement means 3 is the calculation of the employment rates for individual call processors 20 to 2n.

Figure 3:
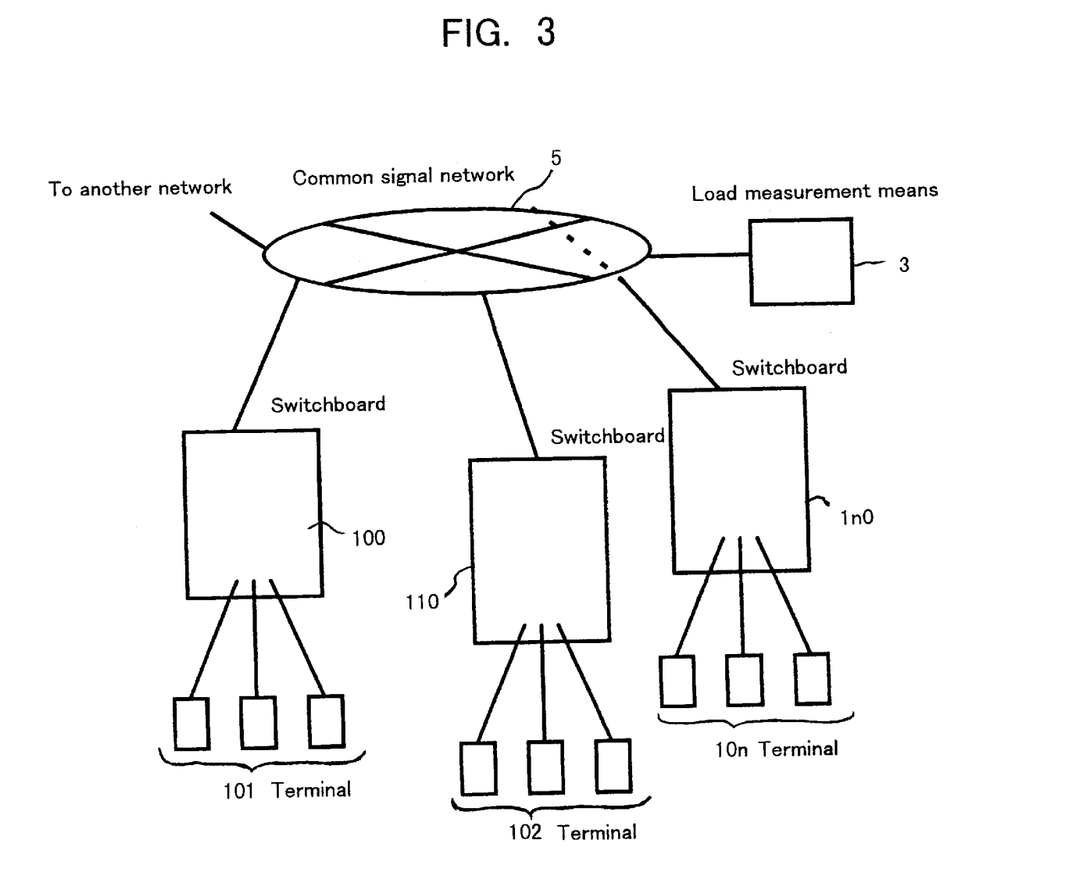
FIG. 3 is a block diagram illustrating a network system, according to an additional embodiment of the present invention, which includes a load measurement means.

In FIG. 3 is shown a network system, according to an additional embodiment of the present invention, in which a plurality of switchboards 100 to 1n0 are connected across a common signal line network 5. Terminals 101 to 10n are connected to the respective switchboards 100 to 1n0.

A load measurement means 3 is provided for the network system. According to the principle explained in FIGS. 4 and 5, the load measurement means 3 measures the load condition for each network and controls distribution of the load to a network, or to networks, having a low employment rate.

The processing of the present invention will now be described.

Figure 6:
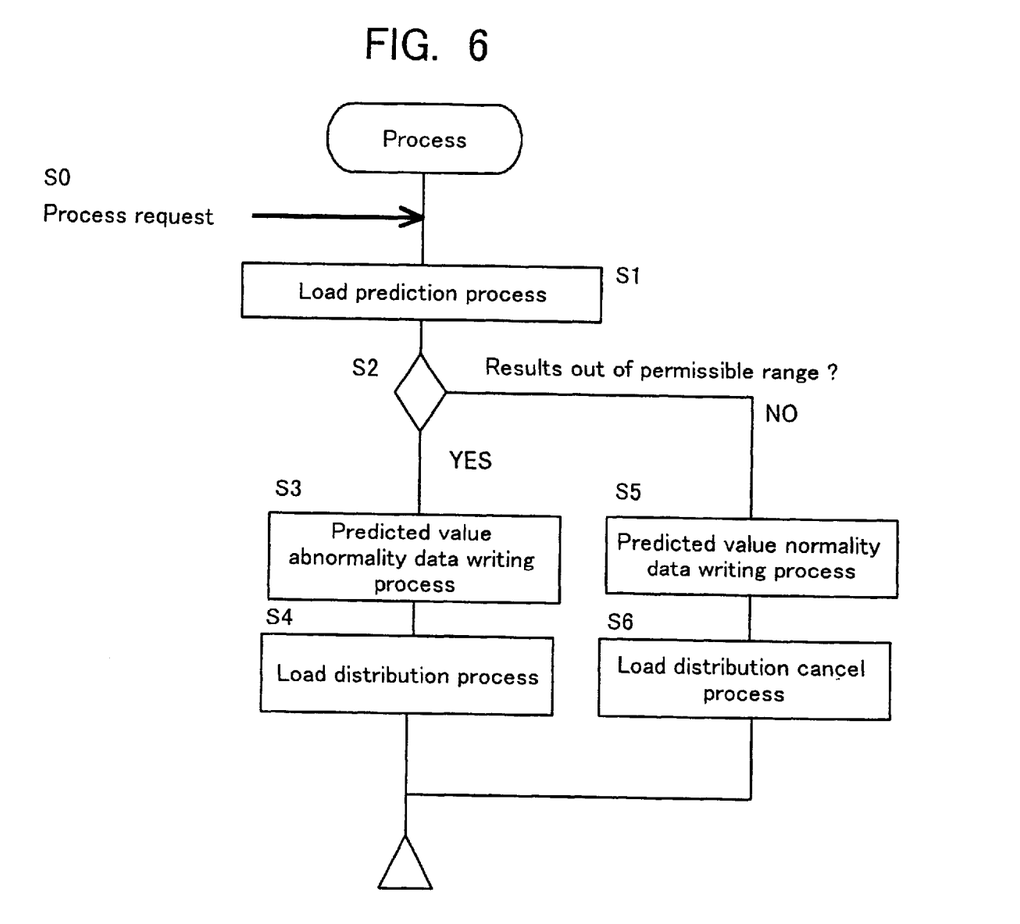
FIG. 6 is a flowchart showing the outline of the distribution processing, according to the present invention, which is performed when load prediction is employed.

FIG. 6 is a flowchart showing the outline of the distribution processing performed when load prediction is employed. When a process request is transmitted to the processors MPR 1 and CPR 20 to 2n, the processing is begun (step S0).

Then, a load prediction process is initiated by activating the load measurement means 30 to 3n or by accessing load prediction data periodically received by a parent processor (step S1).

In the load prediction process, as previously described while referring to FIG. 5, the load measurement means 30 to 3n, or 3, compare the current load data C with the permissible value A of corresponding call processors 20 to 2n, and calculate predicted load value % according to a program which sets predetermined conditions.

A check is performed to determine whether the thus obtained predicted load value % is greater than the permissible value A (step 2). If the predicted load value % is greater than the permissible value A, predicted load abnormality data are written (step S3). When the predicted load value % does not exceed the permissible value A, predicted value normality data are written (step 5).

As is described above, the data in FIG. 7 are data indicating the predicted load state written at step S3 or step S5 in FIG. 6. These data are stored in the main memory MM or the file memory FM for corresponding call processors 20 to 2n.

Figure 7:
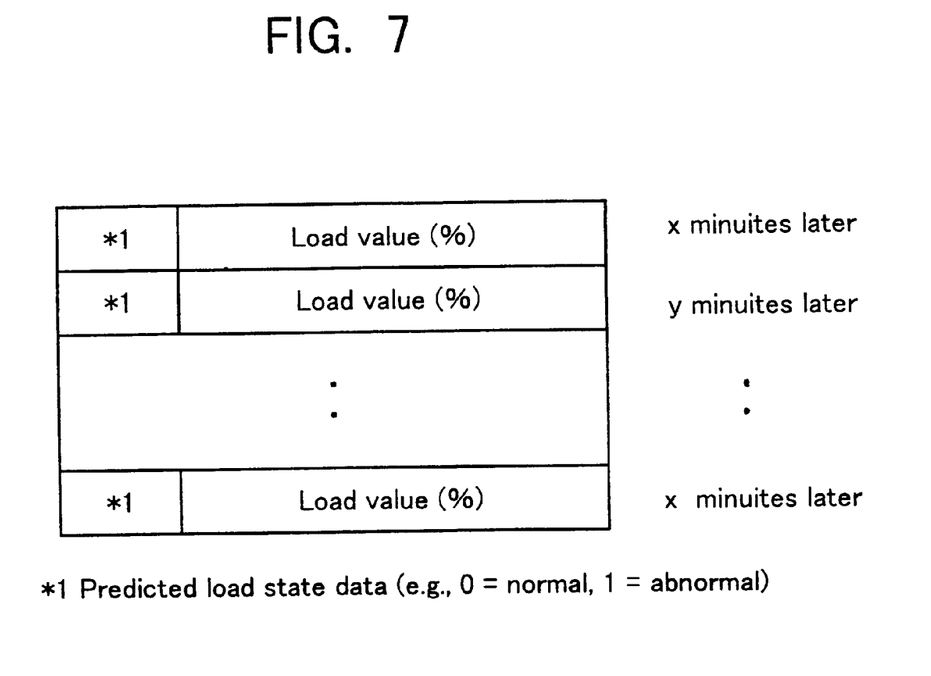
FIG. 7 is a diagram illustrating an example structure of predicted load state instruction data according to the present invention.

In FIG. 7, a normal state (=0) or an abnormal state (=1) is set to the load values % when x, y, . . . z minutes have elapsed, which are acquired by the load measurement means 30 to 3n or 3, and to flags *1 which are set as abnormal when the predicted value exceeds permissible range A, which is explained in FIG. 5.

In the example in FIG. 7 are shown the load values % after a plurality of time periods have elapsed, but these data may only be employed data when a fixed x minutes, which is a predetermined period following the current time, has elapsed.

Therefore, when the predicted load state is abnormal, the load distribution process is performed (step S4). In other words, in the embodiments in FIGS. 1 and 2, in accordance with the data for the individual call processors, the other processors are requested to implement the load distribution process.

Thus the process for one of the call processors 20 to 2n, whose predicted load exceeds the permissible value A, is performed by another call processor having a low employment rate.

In FIG. 6, when the predicted load state is normal, the load distribution cancel process is performed (step S6). In other words, in the embodiments in FIGS. 1 and 2, each call processor transmits a load distribution cancel instruction to another processor.

The sharing process is canceled for one of the call processors 20 to 2n which is sharing the process for another processor, and the original call processor is instructed to perform the process.

Figure 8A:
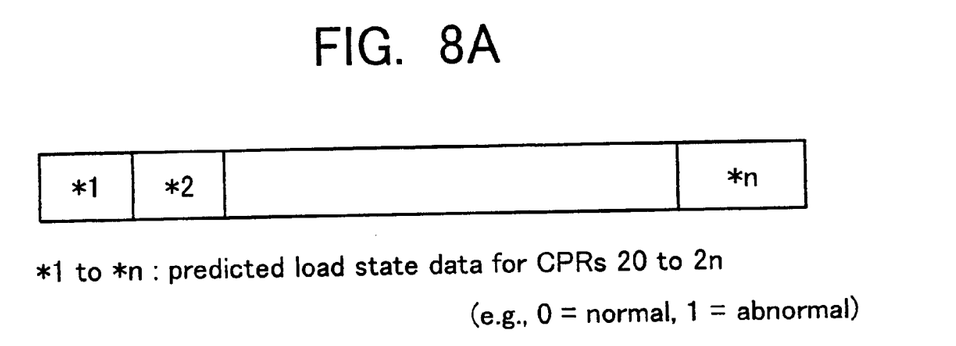
FIGS. 8A to 8C are diagrams illustrating an example arrangement of load state management data.

In FIG. 8A is an example where the predicted load state data which are obtained for the individual call processors 10 to 2n are collected for all the call processors 20 to 2n. In FIG. 8A, *1, *2, . . . are flags which indicate the normality/abnormality of the predicted load value for a corresponding call processor.

Figure 8B:
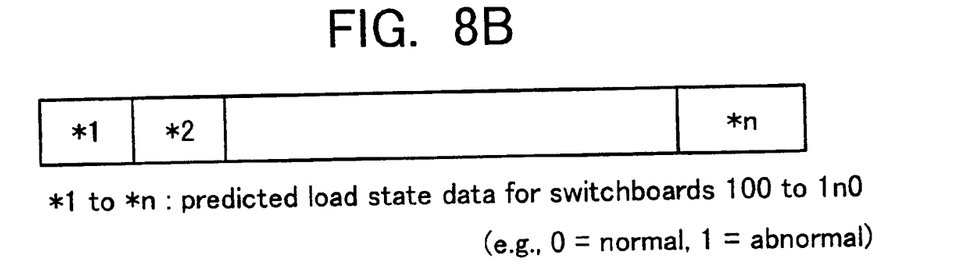
Figure 8C:
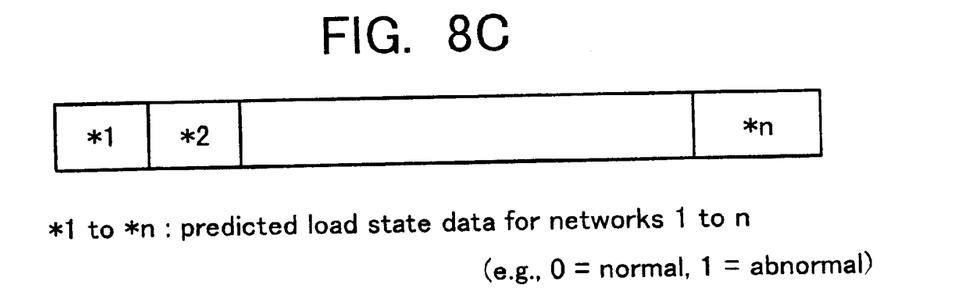

Similarly, in FIG. 8B are shown flags which indicate the normality/abnormality of predicted load state data for the switchboards 100 to 10n in the embodiment in FIG. 3. In FIG. 8C are shown flags which indicate the normality/abnormality of the predicted load state data for n networks that are constructed by terminals accommodated in the switchboards 100 to 10n in the embodiment in FIG. 3.

The data in FIG. 8A are stored in the main memories MM or the file memories FM of the call processors 20 to 2n. Thus, the call processors 20 to 2n can individually apprehend the load state of a neighboring processor.

Further, a call processor may employ an alarm issued by a neighboring processor and the flag information concerning the predicted load value to anticipate the possible distribution of a load to it in the future. Thus, the call processor can examine the load state of a neighboring call processor and can appropriately distribute its own load internally to prepare for the coming load distribution.

When a call processor is notified that the load state of the neighboring processor has eased, the call processor can return to the normal state and the neighboring processor then processes by itself the load that was distributed.

Similarly, the data in FIGS. 8B and 8C are stored in common by the switchboards 100 to 10n. Thus, each network can apprehend the load condition of the neighboring network so that it can prepare for the distribution of a load.

Figure 9:
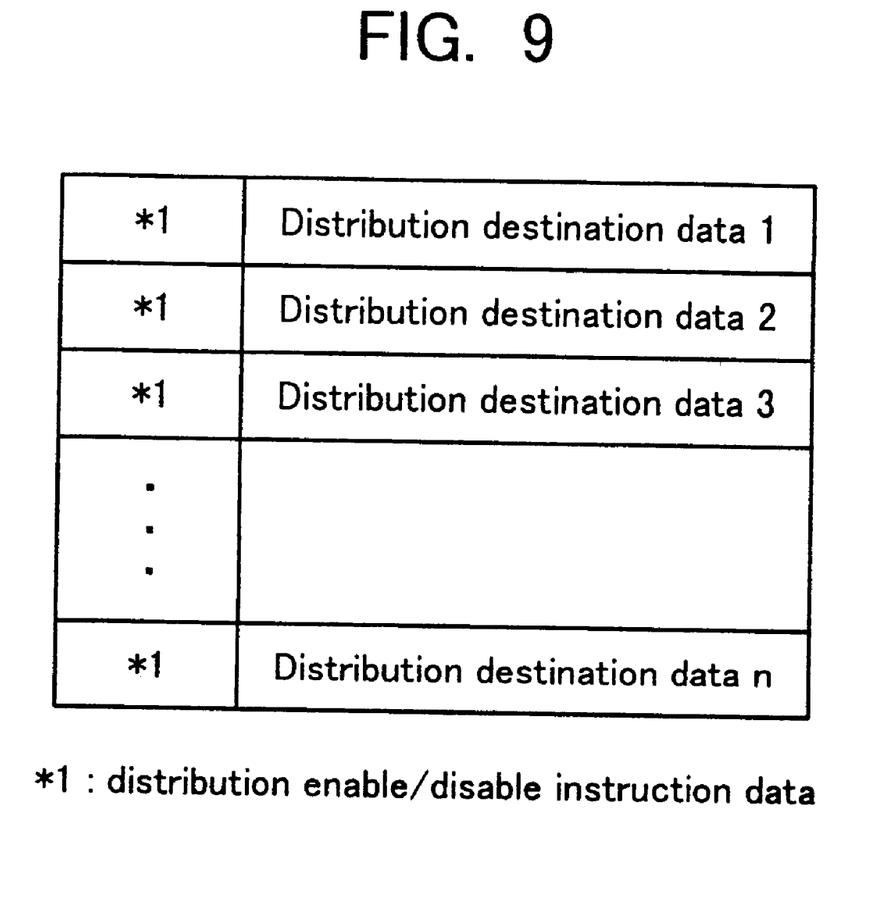
FIG. 9 is a diagram illustrating an example data structure for determining load distribution destinations.

The distribution process will now be explained. FIG. 9 is a diagram illustrating a data structure, which is obtained by exchanging data between distribution apparatuses to determine a load distribution destination.

In FIG. 9 a flag *1 corresponding to the distribution destination is displayed in order to indicate whether load distribution has been enabled. A load can be adequately divided by referring to the flag for data to determine the load distribution destination, so that a coming load distribution can be prepared for.

Figure 10:
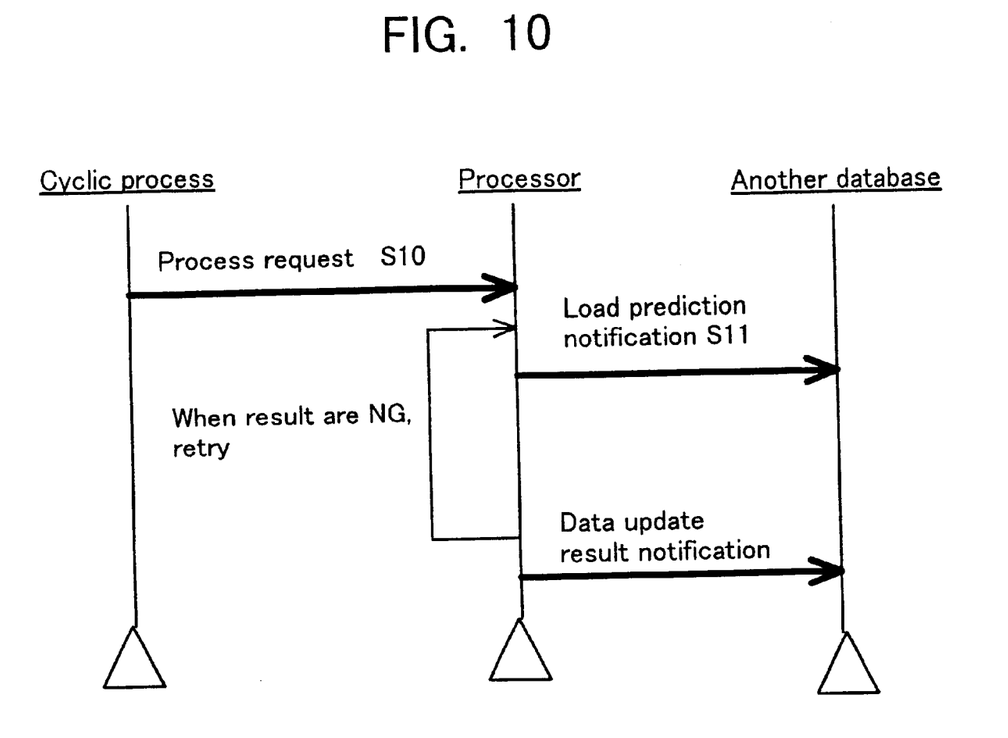
FIG. 10 is a diagram showing the data collection sequence used for determining the load distribution destinations in FIG. 9.

FIG. 10 is a sequence flowchart for collecting data to determine the load distribution destination in FIG. 9. A cyclic process execution means, such as the main processor 1, periodically transmits a process request to a pertinent processor (a call processor in the embodiments in FIGS. 1 and 2, or a switchboard in a network in the embodiment in FIG. 3).

In the embodiments in FIGS. 1 and 2, the pertinent call processor transmits to the database of another call processor a notification of its load prediction state (step S11). Upon receipt of the load prediction state, the database in the other call processor updates, in its own data, that data which corresponds to the processor which is the transmission source.

The updated data are then returned to the notification source processor. Thus, the source call processor can confirm that its load prediction state in the database of the other processor has been updated. This process is performed upon the receipt of a periodical process request from the cyclic process execution means.

As a result, data for determining the load distribution destination in FIG. 9 can be prepared for all the call processors.

Figure 11:
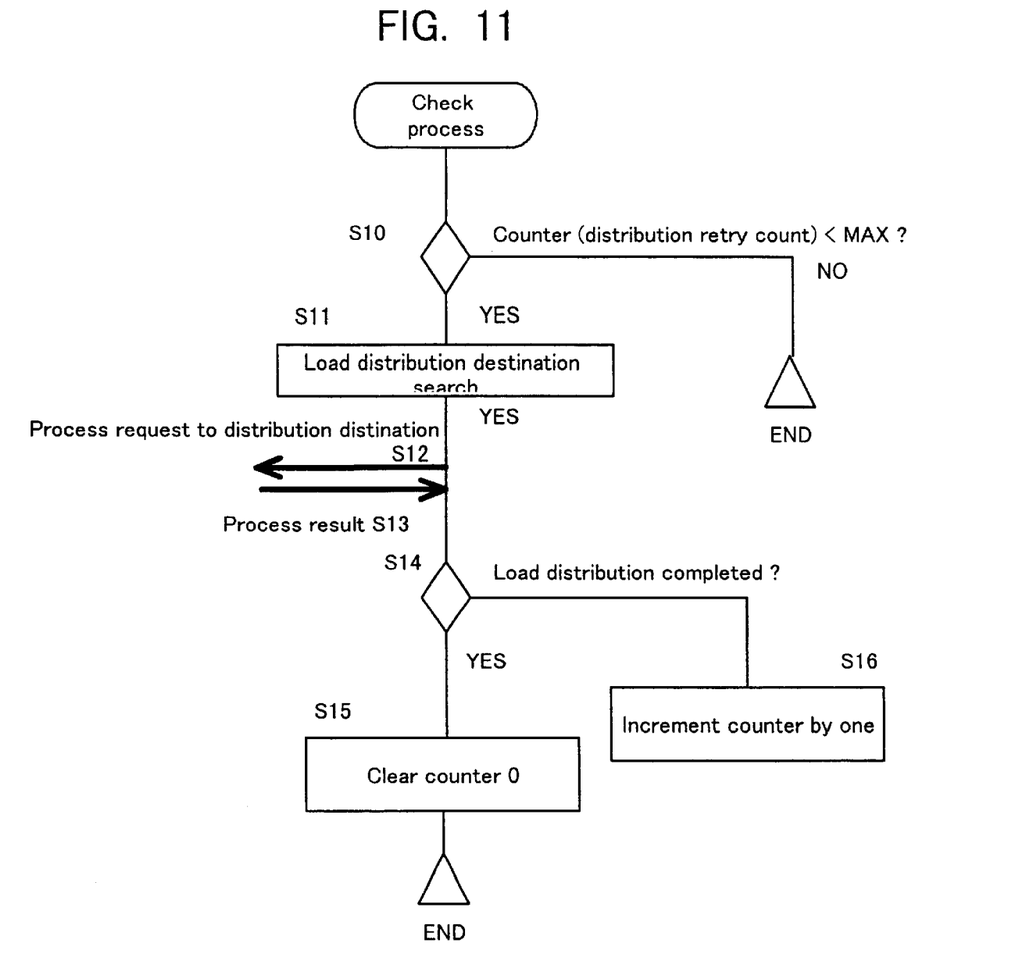
FIG. 11 is a flowchart showing a distribution destination checking process.

A periodical process request from the cyclic process execution means has been employed, but this request is not necessarily issued periodically. When the request is issued only upon a change in the state, the efficiency of the process is increased. FIG. 11 is a flowchart for distribution destination check processing. When a specific processor requires the initiation of the load distribution process before the predicted load value becomes abnormal, a distribution destination is determined by referring to the data in FIG. 9 which is used for determination of the load distribution destination.

In the distribution destination checking process in FIG. 11, first, a check is performed to determine whether a distribution retry count exceeds a predetermined maximum value MAX (step S10). When the retry count does not exceed the maximum value MAX, a search is initiated for the load distribution destination (step S11).

That is, the data in FIG. 9 which are used for the determination of a load distribution destination are employed to find a distribution destination for which a distribution enable flag has been set, and a process request is transmitted to that distribution destination (step S12). Upon the receipt of the request, the distribution destination transmits a notification of the processing results (step S13).

Then, a check is performed to determine whether a process for a call processor which should be distributed has been distributed to the other processor (step S14). When the distribution process has been completed, a distribution retry counter is cleared (step S15). When the distribution process has not been completed, a distribution retry counter is incremented by one (step S16).

Program control returns to step S10. When the retry counter reaches the maximum value MAX, it is assumed that further distribution is disabled, and the processing is thereafter terminated.

In the above embodiments, when the processing capability is varied by adding or removing resources, such as processors, accordingly, the load prediction means 30 to 3n and 3 change the permissible values for the load prediction data.

As is described above, according to the present invention, the abandonment of a process can be avoided by the regulation of the congestion which now occurs in the current load control process. As a result, improved service can be provided.

In addition, the concentration of a load is prevented due to load prediction, and since the load is efficiently distributed, a maximum process capacity can be demonstrated for the system. Furthermore, since the data acquired in the past are also employed, load distribution can be performed which is based on a reliable prediction.

The above-described embodiments are employed only for explaining the present invention, and the present invention is not limited to these embodiments. The protective scope of the present invention is defined by claims, and the equivalent of the range of the claims is also included within the protective scope of the present invention.

What is claimed is:

1. A control apparatus, which employs load prediction for system optimization, comprising:
    a plurality of processors;
    a control target which is controlled by said plurality of processors;
    a load measurement means for comparing a current load with time-transient, reference load data, for said plurality of processors, which is obtained based on previously acquired measurement data, and for employing the result to prepare a future load prediction for each of said processors; and
    a control means for controlling distribution of a load for a specific processor to the other processors when a predicted load for said specific processor exceeds said reference load data.

2. A control apparatus according to claim 1, wherein said load measurement means is provided for each of said plurality of processors.

3. A switchboard, which employs load prediction for system optimization, comprising:
    a plurality of switches for switching a call;
    a plurality of processors for controlling said plurality of switches;
    a load measurement means for comparing a current call process load with time-transient, reference call process load data, for said plurality of processors, which is obtained based on previously acquired measurement data, and for employing the result to prepare a future call process load prediction for each of said processors; and
    a control means for controlling distribution of a load for a specific processor to another processor having a low employment rate when a predicted call process load for said specific processor exceeds a predetermined permissible value which is based on said reference call process load data.

4. A switchboard according to claim 3, wherein said load measurement means is provided for each of said plurality of processors.

5. A switchboard according to claim 3, further comprising a means for notifying a maintenance man of said reference call process load data.

6. A switchboard according to claim 4, further comprising a means for notifying a maintenance man of said reference call process load data.

7. A switchboard according to claim 3, wherein a congestion level, for one of said processors, which is acquired from a future call process load prediction prepared by said load measurement means is reported to another processor.

8. A switchboard according to claim 4, wherein a congestion level, for one of said processors, which is acquired from a future call process load prediction prepared by said load measurement means is reported to another processor.

9. A control apparatus according to claim 1, wherein said control means, for controlling distribution of a load imposed on a specific processor to other processors when a predicted load to be imposed on said specific processor exceeds said reference load data, regulates said predicted load when said predicted load exceeds said reference load data.

10. A control apparatus according to claim 2, wherein said control means, for controlling distribution of a load imposed on a specific processor to other processors when a predicted load to be imposed on said specific processor exceeds said reference load data, regulates said predicted load when said predicted load exceeds said reference load data.

11. A switchboard according to claim 3, wherein said control means, for controlling distribution of a load imposed on a specific processor to another processor having a low employment rate when a predicted call process load for said specific processor exceeds a predetermined permissible value based on said reference call process load data, controls call process load optimization so as to regulate calls which are input.

12. A switchboard according to claim 4, wherein said control means, for controlling distribution of a load imposed on a specific processor to another processor having a low employment rate when a predicted call process load for said specific processor exceeds a predetermined permissible value based on said reference call process load data, controls call process load optimization so as to regulate calls which are input.

13. A switchboard according to claim 3, wherein said previously acquired measurement data are updated based on said current call process load.

14. A switchboard according to claim 4, wherein said previously acquired measurement data are updated based on said current call process load.

15. A switchboard according to claim 3, wherein said permissible value which is to be distributed by said control means is updated based on the latest available resources.

16. A switchboard according to claim 4, wherein said permissible value which is to be distributed by said control means is updated based on the latest available resources.

17. A network system, which employs load prediction for system optimization, comprising:
    a plurality of networks connected to a common signal line network;
    a load measurement means for comparing a current call process load with time-transient, reference call process load data, for said plurality of networks, which is obtained based on previously acquired measurement data, and for employing the result to prepare a future a future call process load prediction for each of said networks; and
    a control means for controlling distribution of a load for a specific network to another network having a low employment rate when a predicted call process load for said specific network exceeds a predetermined permissible value which is based on said reference call process load data.

18. A network system according to claim 15, wherein said load measurement means is provided for each of said plurality of processors.

19. A network system according to claim 17, further comprising a means for notifying a maintenance man of said reference call process load data.

20. A network system according to claim 19, further comprising a means for notifying a maintenance man of said reference call process load data.

21. A network system according to claim 17, wherein a congestion level, for one of said networks, which is acquired from a future call process load prediction prepared by said load measurement means is reported to another network.

22. A network system according to claim 19, wherein a congestion level, for one of said networks, which is acquired from a future call process load prediction prepared by said load measurement means is reported to another network.

23. A network system according to claim 17, wherein said control means, for controlling distribution of a load imposed on a specific network to other networks when a predicted load to be imposed on said specific network exceeds said reference load data, regulates said predicted load when said predicted load exceeds said reference load data.

24. A network system according to claim 19, wherein said control means, for controlling distribution of a load imposed on a specific network to other networks when a predicted load to be imposed on said specific network exceeds said reference load data, regulates said predicted load when said predicted load exceeds said reference load data.

25. A network system according to claim 17, wherein said control means, for controlling distribution of a load imposed on a specific network to another network having a low employment rate when a predicted call process load for said specific network exceeds a predetermined permissible value based on said reference call process load data, controls call process load optimization so as to regulate calls which are input.

26. A network system according to claim 18, wherein said control means, for controlling distribution of a load imposed on a specific network to another network having a low employment rate when a predicted call process load for said specific network exceeds a predetermined permissible value based on said reference call process load data, controls call process load optimization so as to regulate calls which are input.

27. A network system according to claim 17, wherein said previously acquired measurement data are updated based on said current call process load.

28. A network system according to claim 18, wherein said previously acquired measurement data are updated based on said current call process load.

29. A network system according to claim 11, wherein said permissible value which is to be distributed by said control means is updated based on the latest available resources.

30. A network system according to claim 18, wherein said permissible value which is to be distributed by said control means is updated based on the latest available resources.

* * * * *